MAGNETIC MEMORY SWITCHING DEVICE, PARTICULARLY FOR TELEPHONY

Filed Oct. 31, 1966

11=OPEN CONTACTS
H=CLOSED CONTACTS

June 30, 1970 B. JEAN-JACQUES CANCEILL ET AL 3,518,626

MAGNETIC MEMORY SWITCHING DEVICE, PARTICULARLY FOR TELEPHONY

Filed Oct. 31, 1966 3 Sheets-Sheet 2

June 30, 1970 B. JEAN-JACQUES CANCEILL ET AL 3,518,626

MAGNETIC MEMORY SWITCHING DEVICE, PARTICULARLY FOR TELEPHONY

Filed Oct. 31, 1966 3 Sheets-Sheet 3

United States Patent Office 3,518,626
Patented June 30, 1970

3,518,626
MAGNETIC MEMORY SWITCHING DEVICE, PARTICULARLY FOR TELEPHONY

Bernard Jean-Jacques Canceill, Paris, and Albert Regnier, Issy-les-Moulineaux, France, assignors to International Standard Electric Corporation, New York, N.Y., a corporation of Delaware Filed Oct. 31, 1966, Ser. No. 595,297
Claims priority, application France, Nov. 12, 1965, 38,110
Int. Cl. H04q *9/00*
U.S. Cl. 340—166 2 Claims

ABSTRACT OF THE DISCLOSURE

A switching matrix uses glass reed contacts arranged in rows and columns. The crosspoints in alternate rows have their windings and core structures arranged to present alternate magnetic polarities so that stray flux cannot operate adjacent crosspoints.

In prior art patents, there have been described a relay of a kind used in telephone switching, especially at the crossing points of a switching grid. By way of an example of such prior art devices, reference may be had to a co-pending application S.N. 423,226, filed Jan. 4, 1965, entitled, "Magnetic Memory Switch and Array" by Regnier and Silerme, inventors, and assigned to the assignee of this invention.

These relays have contacts with magnetic armatures and a magnetic circuit which comprises two cores endowed with magnetic remanence, in such manner that the relay is endowed with magnetic memory. The cores can be magnetised, either in series or in opposition. When they are magnetised in series, they create a magnetic flux which is in a closed loop in the magnetic circuit, without reaching the magnetic armatures. The latter remain withdrawn or withdraw; the contacts are open and the relay is released. When the cores are magnetised in opposition, they create two opposed magnetic fluxes which are closed through air and passing through the magnetic armatures. The latter are attracted; the contacts close and the relay is operated. These relays are provided with two exciting circuits, which are placed on the two cores in such manner that, when one or the other of the two circuits is excited, the cores are magnetised in series; whilst, when the two are excited together the cores are magnetised in opposition.

In a switching grid in which the relays are placed at the crossing of the lines and columns of the grid, the exciting circuits are associated some with the lines and the others with the columns. When it is desired to connect a line to a column, a circuit is excited in all the relays placed on this line and the other circuit in all the relays placed on this column. Thus the relay placed at the desired crossing point has its two circuits excited and operates, whilst the other relays placed on the same line or on the same column have only one circuit excited and remain at rest or released. The remanence of the cores then keeps the relays in the state in which their circuits of excitation have put them. In certain systems, the relays are released after the communication. In others they are released later, on the occasion of a new connection which engages the line or column in which they are to be found.

However, the dispersion fluxes of the relays which are magnetised in opposition in a switching grid also pass through the magnetic armatures of neighbouring relays. In certain cases, these fluxes are capable of causing the attraction of the armatures and the closure of the contacts in released relays the contacts of which ought to remain open. It has been noted that the dispersion fluxes always add together in a switching grid in which, to simplify the construction, all the relays were alike and were magnetised in the same direction. It has been proposed to alternate the direction of magnetisation of the relays in space. In the arrangement which has been proposed, the magnetisation should be alternated from one relay to the other following the two coordinates of the grid, in the form of a chequer board. The invention of the direction of magnetisation should be obtained by inversing the direction of the exciting windings on the relays.

The present invention offers another device of alternate magnetisation of the relays in a switching grid. In this device the means used to invert the direction of magnetisation are particular to the exciting circuits special to the relays described, and the arrangement of alternation suits the special method of realisation of tripolar or like relays.

In the relays described, the two exciting circuits mentioned above each comprise two separate branches. To one of these branches a brief impulse is applied and to the other a long impulse. The two "long" branches are windings placed on the two cores to magnetise them in opposition. The "short branch" of each circuit is a winding placed on the same core as the "long" winding of the other, in balanced opposition with it. Thus, in a relay in which a single circuit is excited, the two cores are magnetised in series by the two impulses applied together to the two windings, and they thus remain magnetised after the passage of the two impulses. In a relay in which the two circuits are excited together, exciting is at first without effect, for the effects of the two windings are annuled on each core. After the passage of the brief impulses in the two circuits, the two "long" windings act alone and magnetise the cores in opposition. After the passages of the long impulses, the cores remain magnetised in opposition.

In relays previously known, the direction of magnetisation could be inverted, either by inverting the polarity of the exciting currents, or by inverting the direction of the windings on the cores. The particular exciting circuits described in the principal patent, as recalled above, offer another means of inverting the direction of magnetisation.

The alternation device according to the present invention can be characterised in that the long impulses are interchanged with the short impulses in the branches of the two exciting circuits, in a manner to invert the direction of magnetisation. The impulses can be interchanged in the two branches of each exciting circuits; or else, they can be interchanged in the respective branches of the two circuits. This device does not touch either the polarity of the sources of exciting current, or the direction of the windings on the relays, contrary to the device previously proposed and mentioned above. It will be seen that it does not even touch the wiring of the exciting circuits on a switching grid, but only their external connections.

In another prior art device, the two remanence cores are disposed between the opposite diagonal corners of two square blocks, and the magnetic armatures among these blocks following the other diagonal. With regard to this method of realisation, the alternation device according to the present invention can be characterised by an arrangement of alternation from one line to the other, without alternation in the lines of the switching grid. The useful effect of this arrangement will be explained further on, it being understood that the cores and the armatures are directed in the third dimension of the grid.

It should be understood that the designation of the two coordinates of the grid by the terms "lines" and "columns" is arbitrary and is not of a nature to limit the invention.

The invention will be described in more detail with reference to the accompanying drawings in which.

Figure 4:
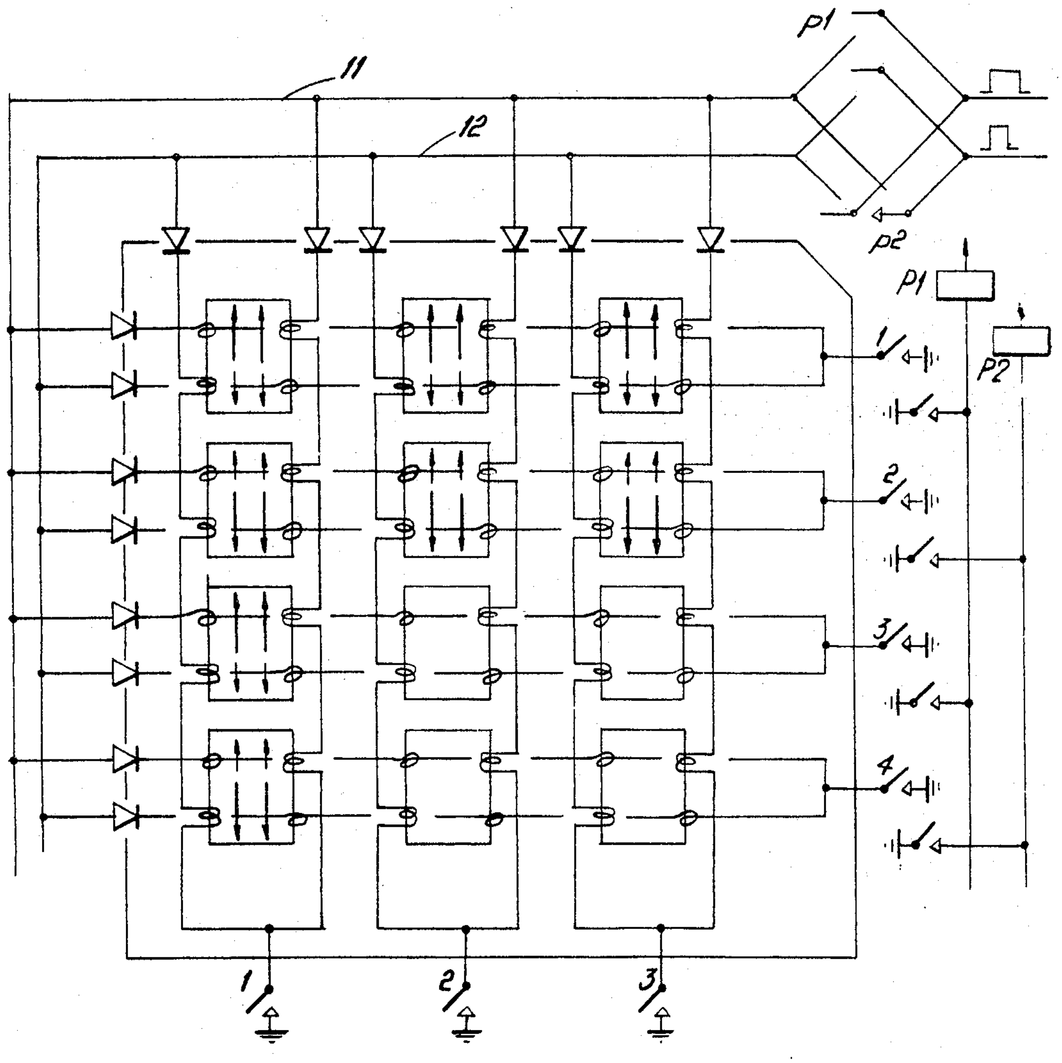
Figure 5:
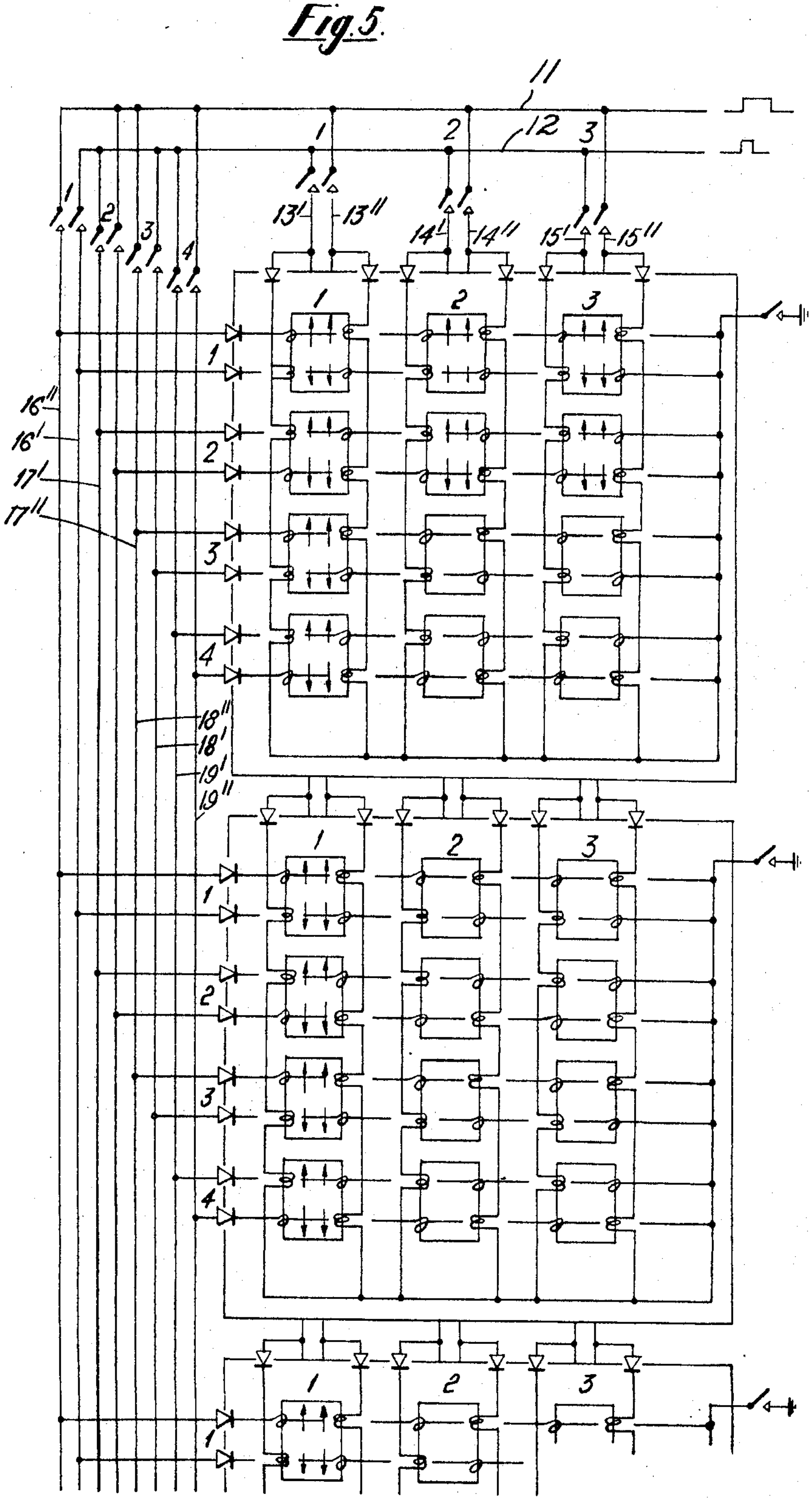

FIG. 4 is a schematic which shows, by way of example, an arrangement of exciting circuits alternated from one line to the other, in a separated matrix, with a changeover of the impulses on the whole of the matrix; and FIG. 5 shows another example of circuit arrangement, in a group of uniform switching constituted by several matrices, with a changeover of the impulses from one line to the other in each matrix.

Figure 1:
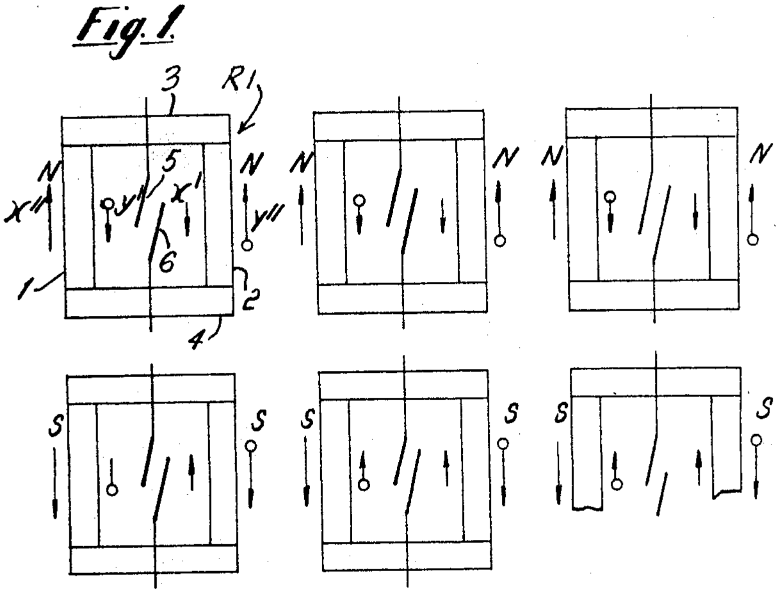
FIG. 1 shows schematically some relays of the kind mentioned disposed in a two co-ordinate matrix, with the different magnetisation in their cores.

FIG. 1 shows schematically some relays (such as R1) of the kind mentioned, disposed in a two co-ordinate matrix to form a switching grid. The drawing shows these relays in the plane of the matrix, but it should be understood that they are oriented following the third dimension of the matrix. Each relay comprises two remanent magnetic cores 1, 2 placed between two blocks 3, 4 to form a closed magnetic circuit. The magnetic armatures 5, 6 are placed between the blocks 3, 4, and between the cores 1, 2 to be attracted when the cores are magnetised in opposition and create a return flux through the air. In practice these armatures are placed in a sealed bulb, which is not shown.

The cores 1, 2 can be magnetised by two exciting circuits associated with the two coordinates of the matrix. The circuit associated with the lines creates a dominant excitation $x''$ in the core 1 and a subordinate excitation $x'$ in the core 2, of opposite direction in space, of a kind that this circuit magnetises the core in series in the magnetic circuit. The magnetic flux is established in a closed loop without passing through air and the armatures 5, 6 remain withdrawn or withdraw themselves. The exciting circuit associated with columns, creates of itself a dominant excitation $y''$ in the core 2 and a subordinate excitation $y'$ in the core 1, of the same direction in space as the excitation $x''$ and $x'$. This circuit acts in the same manner as the first, only the direction of the flux in the closed loop is inverted. However, when the two circuits are excited together, the dominant excitation $x''$ and $y''$ suppress in one manner or another, the subordinate excitation $x'$ and $y'$, and the cores 1 and 2 are found magnetised in opposition by the excitations $x''$, $y''$. That creates a return flux through the air, or dispersion flux, which passes also through the magnetic armatures. The latter are attracted and close the contact in the circuit controlled by the relay.

In a uniform matrix, in which all the relays are constructed and directed in like manner, it is seen that the relays magnetised in opposition have all their flux directed in the same direction in space (from bottom to top in the drawing and in the third dimension in reality). This direction of the flux is denoted by the large arrows $x''$, $y''$ with the letter N (north) above.

Figure 2:
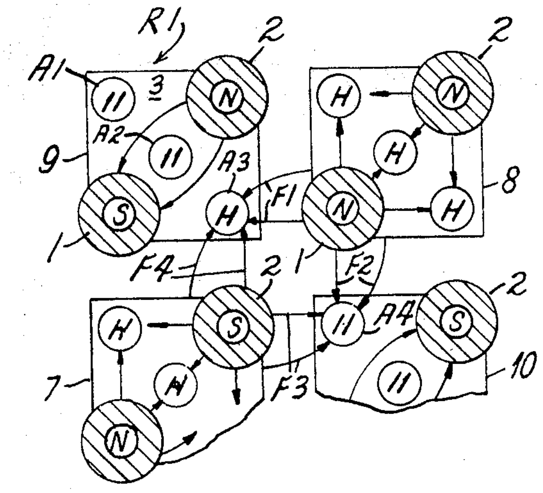
FIG. 2 shows the undesirable effect of the dispersion flux in neighbouring relays, when the relays are all magnetised in the same direction in space.

Four relays arranged according to FIG. 1 are shown in a plan view in FIG. 2. The cores 1, 2 which carry the windings are cross hatched on the drawing are placed at the opposite diagonal corners of the square blocks 3 or 4. Three pairs of magnetic armatures A1, A2, A3 (shown in section in the direction of the contact plane) are placed in the direction of the other diagonal. It is supposed that the relays 7 and 8 are magnetised in opposition, with the north magnetic pole N on the two cores 1, 2 of each. The relays 9 and 10 are magnetised in series, with a pole N on one core and a pole S on the other. The flux of the relays 7 and 8 are in part closed by the armatures of these relays, which are mutually attracted.

The armatures of the relays 9, 10 ought to remain apart since the cores 1, 2 are differentially energized as indicated by the letters N and S. However, the flux F1, F2, F3, F4 of the relays 7, 8 is closed also in part by the neighbouring armatures A3, A4 of the relays 9, 10 which are inductively attracted. This flux closes the contacts which ought to be open in view of the coil energization. It is understood that if the magnetisation of the relays were alternated in chequer board pattern, the relays 7 and 8 would remain magnetised, both in the same direction. The situation shown in FIG. 2 would remain unchanged, save for the polarity in relays 9 and 10 which would remain inverted without any effect from the point of view considered.

Figure 3:
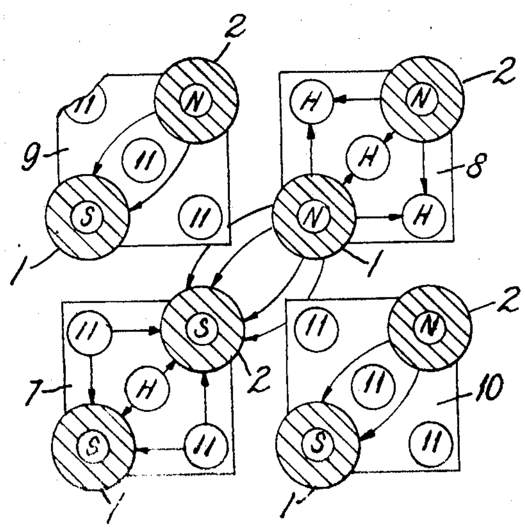
FIG. 3 shows the absence of this undesirable effect when the magnetisation is alternated from one line to the other, according to the invention.

The situation changes, on the other hand, when the magnetisation alternates from one line to the other, as is shown in FIG. 3. It is supposed that the direction of magnetisation on lines 9, 8 of FIG. 3 is the same as on FIG. 2, and that it is inverted on the line 7, 10 of FIG. 3. Note that core 1, line 7, is now south and core 2, line 10, is now north. The two cores of the relay 7 here show their poles S (south). The dispersion flux of the neighbouring poles, S of the relay 7 and N of the relay 8, is preferably closed between these poles, without passing through the neighbouring armatures of the relays 9 and 10. These armatures remain withdrawn. The error of operation is thus suppressed.

In the relays described, the relation between the dominant excitation and the subordinate excitation is obtained from the fact that in each exciting circuit, the dominant winding receives a long impulse, and the subordinate winding, a short impulse. The impulses are applied at the same time to the two windings (in the separated branches of the exciting circuit), then the short impulse passes, and the long impulse which alone remains imposes its magnetisation.

FIG. 4 shows, by way of example, an arrangement of circuits in which the alternation of the magnetisations from one line to the other is obtained by changing over the application of the impulses to the set of relays according to the parity of the line which should be excited. On this figure (as on FIG. 1) the large arrows and the small arrows designate the dominant windings and the subordinate windings. All the exciting circuits are branched on a common line 11, 12 to which the long and short impulses (above and to the right on the drawing) are applied by an inverter switch p1, p2.

When an odd line (1 or 3 on the drawing) should be excited, the return contact to earth of this line (on the right of the drawing) is closed at the same time as the switching contacts p1. The long impulse is then applied to the wire 11 and the short impulse to the wire 12. The dominant magnetisation is then from bottom to top in the relays of this line. When an even line (2 or 4) on the drawing should be excited, the return contact to earth of this line is closed at the same time as the switching contacts p2. The long impulse is then applied to the wire 12, and the short impulse to the wire 11. The dominant magnetisation is then from top to bottom in the relays of this line. This magnetisation is maintained by remanence after the passage of the impulses.

It is supposed on the drawing, that the switching contacts are the contacts of two relays p1, p2; the relay p1 is actuated by contacts associated with the odd lines (1, 3) the relay p2 is actuated by contacts associated with the even lines (2, 4). In reality, the control of the exciting circuits will rather be made by electronic means.

Another example of circuit arrangements is shown in FIG. 5. This arrangement is here applied to a group of uniform switching, composed of several switching grids similar to one another. The exciting circuits of the columns of the same rank in all the grids are branched on multiples 13'–13", 14'–14", 15'–15" which are themselves branched on the general line 11, 12, separately and under the control of selector contacts of column rank. The exciting circuits of the lines of the same rank in all the grids are branched on multiples 16"–16', 17'–17", 18"–18' and 19'–19", which are themselves branched on the general line 11, 12, separately and under the control of selector contacts of line rank. The return to earth is made separately for each grid, by grid selector contacts (to the right in the drawing). A given relay is excited by closing at the same time a pair of contacts of column rank, a pair of contacts of line rank and a grid contact.

When all the multiples of column rank are similarly branched on the line 11, 12, the line rank multiples are branched in a alternating manner. On the relays, the two windings mounted on each core, and associated with the two co-ordinates, are changed over from one line to the other. As a result of these alternations, the "long" winding of each circuit is changed over with the "short" winding of the other. Thus, in the first line, the winding above and to the left is a "long" line winding ($x''$ and FIG. 1) whilst in the second line, the winding above and to the left is a "short" column winding ($y'$ in FIG. 1) and so on for the four windings. The desired alternation, from one line to the other, is thus obtained without general switching over of the impulses. It is to be understood, here also, the circuits will be controlled in reality by electronic means rather than by relays.

It will be understood that many variations can be realised in the framework of this invention, and specially as regards the arrangements of exciting circuits intended to give the desired alternation in the most convenient manner, as the case may be. The description given above, of several examples of putting it in practice, ought not to be understood in any sense which would limit the ambit of this invention.

What is claimed is:

1. An electro-mechanical co-ordinate switching arrangement comprising a plurality of crosspoint devices arranged in rows and columns, each of said crosspoint switching device comprising two pair of windings symmetrically placed on two cores, each of said pair of windings providing equal magnetomotive forces, each of said cores carrying a first winding of one pair and a second winding of another pair arranged in series circuits defining said rows and columns of crosspoints, contact means associated with each of said cores for operating responsive to simultaneous energization of both of said two pair of windings and releasing responsive to an individual energization to either of the two pair alone, means for applying relatively short pulses to a first pair of said windings to drive core flux one step, and means for applying a relatively long pulse to the other pair of said windings to drive said core flux a second step, core remanence flux holding said contacts operated after said two pair of windings have been energized simultaneously by said long and short pulses and releasing said contacts after either of said pair has been energized separately, and means for effectively reversing on adjacent rows and columns the connections for applying said long and short pulses respectively.

2. The device of claim 1 wherein a plurality of said cores are arranged in a cordinate array, said series circuits comprising a first of said of windings on each of said cores being extended to define rows in said array and a second of said pairs of windings being extended to define columns in said array, said series circuits being grouped into two branched circuits, the electromotive forces produced on said cores by energizations of said windings being such that pulses on two intersecting coordinates operate contacts at the crosspoint where said selected coordinates intersect and release all other crosspoints on each of said selected coordinates, and means for alternating between said two branched circuits for adjacent crosspoints.

References Cited

UNITED STATES PATENTS

| | | | |
|---|---|---|---|
| 3,118,090 | 1/1964 | Keller | 317—137 |
| 3,206,649 | 9/1965 | Feiner | 317—137 |

DONALD J. YUSKO, Primary Examiner

U.S. Cl. X.R.

317—137